US010373017B2

(12) United States Patent
Hendlin et al.

(10) Patent No.: US 10,373,017 B2
(45) Date of Patent: Aug. 6, 2019

(54) ADDING NEW CONNECTIONS USING IMAGE RECOGNITION

(71) Applicant: Microsoft Technology Licensing, LLC, Redmond, WA (US)

(72) Inventors: Zachary Garth Hendlin, San Francisco, CA (US); Samish Chandra Kolli, San Jose, CA (US); Feng Zou, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 15/846,268

(22) Filed: Dec. 19, 2017

(65) Prior Publication Data
US 2019/0188522 A1    Jun. 20, 2019

(51) Int. Cl.
| | |
|---|---|
| G06K 9/00 | (2006.01) |
| G06Q 50/10 | (2012.01) |
| G06K 9/62 | (2006.01) |
| G06K 9/46 | (2006.01) |
| G06K 9/48 | (2006.01) |
| G06F 16/9535 | (2019.01) |
| H04L 29/08 | (2006.01) |
| G06K 9/66 | (2006.01) |

(52) U.S. Cl.
CPC ....... *G06K 9/6202* (2013.01); *G06F 16/9535* (2019.01); *G06K 9/4652* (2013.01); *G06K 9/481* (2013.01); *G06K 9/66* (2013.01); *H04L 67/306* (2013.01)

(58) Field of Classification Search
CPC .... G06K 9/6202; G06K 9/4652; G06K 9/481; G06F 16/9535
See application file for complete search history.

(56) References Cited

U.S. PATENT DOCUMENTS

| | | | |
|---|---|---|---|
| 2010/0274815 A1* | 10/2010 | Vanasco | G06Q 10/107 707/798 |
| 2014/0129627 A1* | 5/2014 | Baldwin | H04L 67/306 709/204 |
| 2015/0199443 A1* | 7/2015 | Gabriel | G06Q 50/16 707/607 |
| 2018/0253193 A1* | 9/2018 | Zeng | G06Q 50/01 |
| 2019/0087865 A1* | 3/2019 | Loree | G06Q 30/0269 |

\* cited by examiner

*Primary Examiner* — David F Dunphy
(74) *Attorney, Agent, or Firm* — Schwegman Lundberg & Woessner, P.A.

(57) ABSTRACT

A method can include comparing a first feature vector detailing features of an image of a newsfeed of a user of users of a social network to a subset of second feature vectors detailing features of newsfeeds presented to the users of the social network; and in response to determining the first feature vector matches a second feature vector of the subset of second feature vectors, providing a name, profile data, and profile picture of a user associated with the newsfeed.

20 Claims, 8 Drawing Sheets

ADDING NEW CONNECTIONS USING IMAGE RECOGNITION

TECHNICAL FIELD

The present application relates generally to connecting members of a website or mobile application using image recognition.

BACKGROUND

A social-networking system, such as LinkedIn, may have its success or usefulness measured at least in part by its ability to generate interest among its members in connecting and engaging with other members on the platform. The more members that are regularly on the platform, the more valuable the service is for individual members (since more of their network is on the platform), recruiters, or other entities who wish to contact those members. The amount of interest generated among the members may depend on many factors, including, for example, the effectiveness of techniques for drawing a user to the system, connecting users to other users of the system, and providing relevant content to the member.

BRIEF DESCRIPTION OF THE DRAWINGS

Some embodiments of the present disclosure are illustrated, by way of example and not limitation, in the FIGS. of the accompanying drawings, in which like reference numbers indicate similar elements.

DETAILED DESCRIPTION

Figure 1:
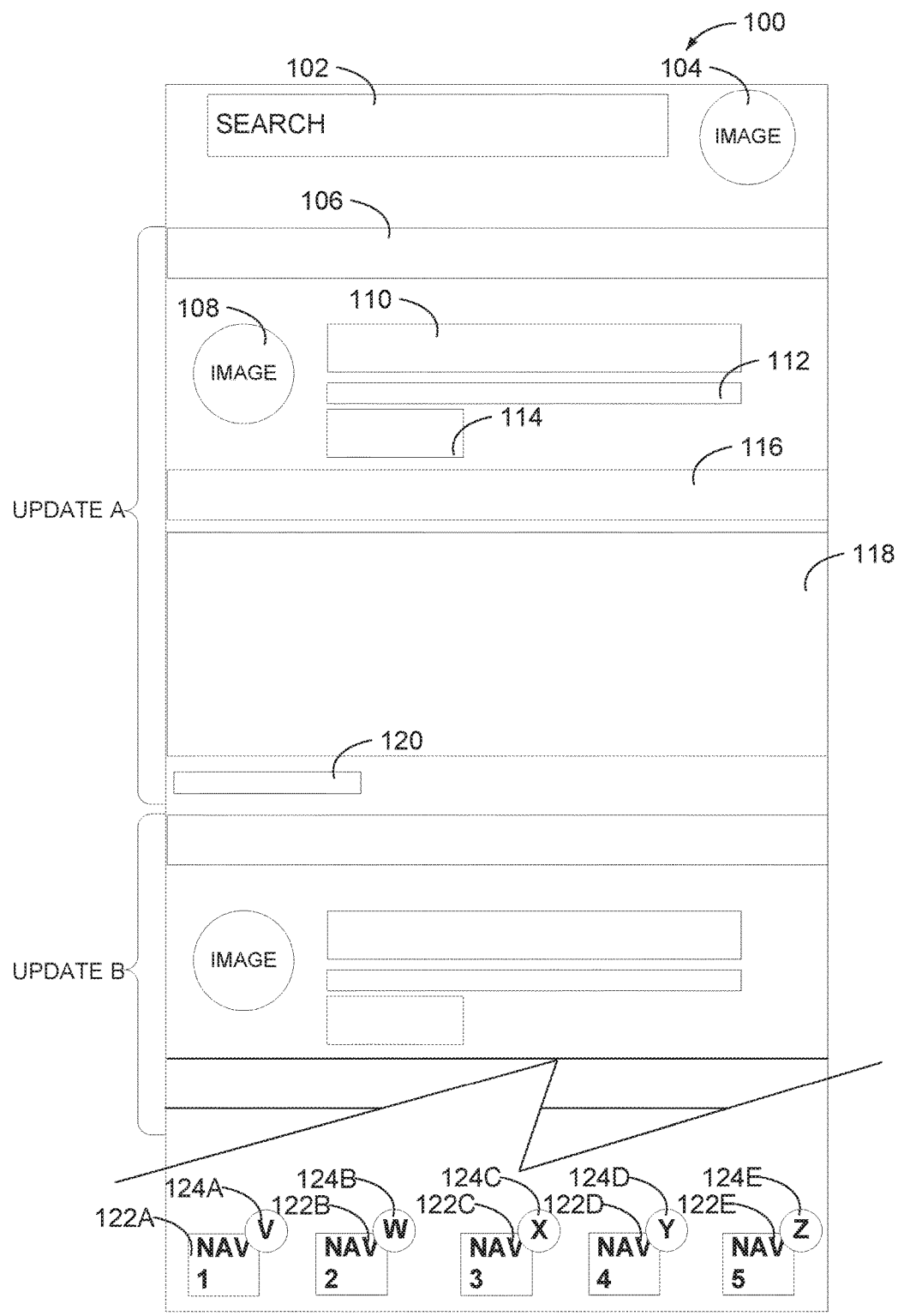
FIG. 1 illustrates, by way of example, a diagram of an embodiment of a user interface on a first user device, such as a newsfeed on a social networking application.

The present disclosure describes embodiments of systems methods, systems, apparatuses, and non-transitory machine-readable mediums for connecting users of a website or application using image recognition.

Current techniques for adding connections between users include: (1) a user typing another user's name in an input box; (2) scanning a quick response (QR) code of another user; (3) other code scanning technologies, such as are implemented on Facebook Messenger provided by Facebook, Inc. of Menlo Park, Calif., USA, or SnapChat provided by Snap, Inc. of Venice, Calif., USA; and (3) Bluetooth or geolocation. Typing a person's name is error prone and often does not yield a unique result, as multiple people on the service can have the same name. Typing a person's name is also time consuming. Typing a person's name is a primary method used by users to connect on websites. Often, when typing a person's name, a user has to sift through a list of users that potentially match the name being searched and subsequently verify with photographs or other information that the match is correct. The QR code or other code scanning technologies require a first user to access a code scanner and a second user to access their unique code to be scanned, which typically is multiple steps away from the main screen of an application. The Bluetooth or geolocation technique requires Bluetooth or location tracking to be enabled (depleting battery of the mobile device), is often inaccurate, or often confused, as many devices can be within range of the device looking to make a connection particularly in large spaces (e.g. a conference).

Embodiments allow a member (A) to connect with another member (B) by accessing a camera through a website or application and taking a picture of a newsfeed of the member to be added. Such embodiments are simpler for a user than navigating to a scan code, more accurate than typing a name in a search utility, and require less battery power than geolocation or Bluetooth.

The newsfeed can uniquely identify a user in a number of ways: (1) an order of individual updates in the newsfeed is known by a website host and is specific to the user; (2) each update has elements, such as like count or social proof from shared connections, that make the update differ in how it renders to different users, further reducing an eligible candidate set; and (3) layouts (e.g., feature vectors of the layouts) of the newsfeed across different platforms can be determined and used to reduce the candidate users. The order of the updates can be based on the user's connections, platform (e.g., iOS, Android, web, or the like), time at which the website is accessed, or other factors. After capturing the user's newsfeed, such as through a screen shot capture or a camera capture, machine learning, such as deep learning, can be applied to extract image features. The image features can be compared other newsfeed image features, such as to match to a pre-existing newsfeed pattern. The feature vector can be learned using a machine learning/deep learning technique, such as a convolutional neural network or a recursive neural network. A set of features that populate the feature vector can be learned such that an information ratio of the features reduces (e.g., optimally reduces) the search space (e.g. set of candidates) with each new feature added to the feature vector. This results in a small set of features which can quickly be used to reduce the candidate set from billions, for example, of newsfeeds served to a unique user. The representative feature vector from the captured image can be calibrated to match to corresponding feed update types or modules. A predefined set of update types can be used as training set.

FIG. 1 illustrates, by way of example, a diagram of an embodiment of a user interface 100 on a first user device. The user interface 100 as illustrated includes features including a search control 102, a profile control 104, a social header 106, a profile image 108 of a user that posted the content related to the social header 106, a name of the user 110 that posted the content, a job title or other characteristics of the user 112, a degree of the connection to the user 114, text of the post 116, other content of the post 118, social counts 120, navigation elements 122A, 122B, 122C, 122D, and 122E, and corresponding badge counts 124A, 124B, 124C, 124D, and 124E. One or more of the features of the user interface 100 can be used to reduce a number of candidate users in a candidate set list, such as to help a user connect with another user on the social network.

A user can search for another user using the search control 102. More details regarding the operation of the search control are provided in FIGS. 2-3, among others. The profile control 104, when selected by a user allows a user to access and manage the settings of their experience on the website. The profile control 104 can include a display of a profile picture of the user logged into the website and for which the newsfeed is being presented.

The social header 106 can include text indicating why the content of the post is being presented to the user. For example, a social header can include "John, Gary, and 3 others like this", or "Fred commented on this post by Herbie V.". The profile image 108 can be the profile picture chosen by the user that made the post. The job title or other characteristic of the user 112 can include a status identifier of the user (e.g., celebrity, politician, or the like).

The degree of the connection to the user 114 can indicate how the user making the post is related to the user associated with the news feed. For example, "Herbie V. is friends with Fred and John". The content of the update 118 can include a picture, video, article, link, or the like. The social counts 120 can indicate a number of likes, comments, shares, or the like of the post.

The navigation element 122A-122E, when selected by a user, allows a user to navigate to different areas of the website. For example, the navigation element 122A-122E can allow a user to navigate to their home page that hosts their news feed, a webpage that displays details regarding a user's network, a webpage that provides a user access to their email through the website, notifications of relevant content on the website, jobs the user may be interested in, or the like. The badge counts 124A-124E indicate how many items are deemed to be of particular interest to the user using the navigation element 122A-122E, respectively. The user interface 100 is merely an example of a user interface of a social network. The user interface 100 can include more or fewer features, features in different locations, other features than those illustrated, or the like.

Some of the features of the user interface 100 provide some degree of uniqueness to each user's newsfeed. Thus, using an image of a user's newsfeed can be a reliable way to uniquely identify a user for potential connection. In particular, there are some aspects of the features of the user interface 100 that can be unique to a specific user. For example, the social header 106 can indicate other users who have liked or commented on the post and are connected to the user. This can reduce the search space to only those users connected to the user(s) mentioned in the social header. Social graph data (see social graph database 512 in FIG. 5 and the corresponding description thereof) can be searched to identify or reduce a set of possible candidates. Consider the degree of the connection to the user 114. This information, like the social header, can be used to reduce (further reduce) the search space to only those connected to the user(s) mentioned in the degree of the connection to the user 114.

The social counts 120 often change over time as a post is shown to more people and the social counts increase. The social counts 120 can be used to identify a time window in which the version of the newsfeed being photographed was presented. The social counts 120 can be used to determine which user's news feeds included the corresponding update with the social counts equal to the values shown. The social count data, similar to the social graph data (connectivity data between members) can be stored in a database 426 or a database in the data layer 505 (see FIGS. 4 and 5).

Another feature of the newsfeed presented on the user interface 110 that can help uniquely identify a user is the ordering of the updates on the news feed. In the news feed illustrated, update A precedes update B. For another user, update B can be presented before update A, presented after another update, update C, or not presented at all. A feed ranking application (e.g., an application of the applications 420, see FIG. 4) can determine an order of the updates and record the order in content delivery database 514, see FIG. 5. A query of the content delivery database 514 can return users who were presented the update A and then the update B in that order, thus reducing the number of possible users for which the newsfeed was presented. The badge count 124A-124E can similarly be recorded in the content delivery database 514 and used to filter (further filter) users that match the newsfeed and had badge counts displayed which correspond to the values in the content delivery database 514.

While FIG. 1 does not show colors, dominant colors of a newsfeed can vary from user to user. For example, a user can have a profile picture with one or more primarily dominant colors in the picture. These colors can be extracted through analysis of the profile picture data and compared to colors that are pre-computed for the user associated with the profile picture (e.g., the image 104). The comparison can help filter (further filter) the users associated with the news feed.

A decision tree can be applied for each filter (in parallel), such as to filter through possible users and uniquely determine the user associated with the newsfeed. A decision tree is a structure in which each internal node represents a condition on an attribute. Each branch of the tree represents the outcome of the condition relative to the attribute. The leaf nodes represent an outcome or classification of all paths to the leaf node.

Figure 2:
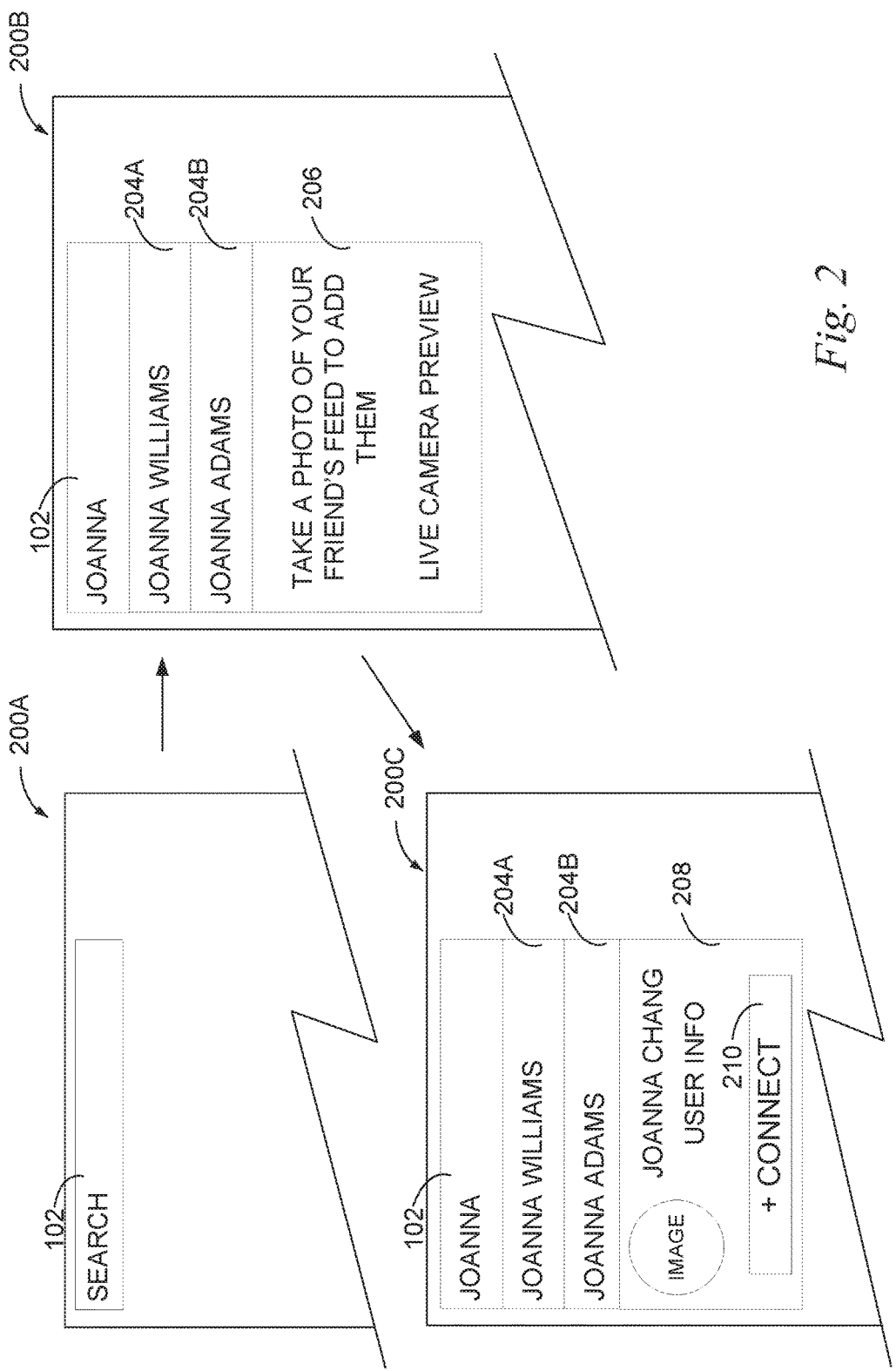
FIG. 2 illustrates, by way of example, a flow diagram of an embodiment user interfaces presented to a user in adding a new connection.

FIG. 2 illustrates, by way of example, a flow diagram of an embodiment user interfaces presented to a user in adding a new connection. A first user interface 200A is presented to the user. The user interface 200A as illustrated includes a search bar control 102. The user can select the search bar control 102 and begin entering a guess at a name of another user with which they would like to connect on the website. The user interface 200B is a view after the user has begun typing a name in the search control 102. As the user types, candidate users 204A and 204B and a field of view 206 of a camera of a mobile device on which the user interface 200B can be provided as the user types. The app that is providing the view of the user interface 200A-200B can access data provided by a camera of the mobile device and render the data in the field of view 206.

The user of the mobile device can move the mobile device to adjust the field of view 206 to include a view of a newsfeed of the user with which they would like to connect. The newsfeed can be presented on a display of a device that is capable of connecting to the website. The mobile device can record image data of the newsfeed. The mobile device can, through the app, extract features from the image, such as can include content of the social header 106, the degree of the connection to the user 114, the social counts 120, an order of the updates in the newsfeed, badge counts 124A-124E, or colors of the profile picture. In one or more embodiments, the mobile device app can determine the feature vector using the app. In one or more other embodiments, the image data can be provided to a server (e.g., application server 418) so that the server can determine the feature vector.

A feature vector can include data indicating features of the newsfeed that can be used to help uniquely identify the user associated with the newsfeed. The features can include content of the social header 106, the degree of the connection to the user 114, the social counts 120, an order of the updates in the newsfeed, badge counts 124A-124E, or colors of the profile picture. The feature vector can be compared to pre-computed feature vectors of the content delivery database 518. Decision trees, other machine learning, or other technique can be used to filter users that are candidates for connecting.

The user interface 200C illustrates a state of the mobile device after filtering users based on the feature vector. A result 208 of the feature vector matching can be provided on the user interface 200C. The result 208 can include a name of the user, a profile picture of the user, profile data, such as a job title, of the user, and a connect control 210 can be provided. In response to a user selecting the connect control 210, a connection request message can be provided to the user associated with the result 208.

A control, such as the connect control, the preview control, camera control, or the like, is a user interface (UI) control element. A UI control element is a visual element that facilitates interaction with underlying software and/or hardware. A UI control can have predefined attributes, operations, and/or values that establish a consistent interaction experience for a user.

Figure 3:
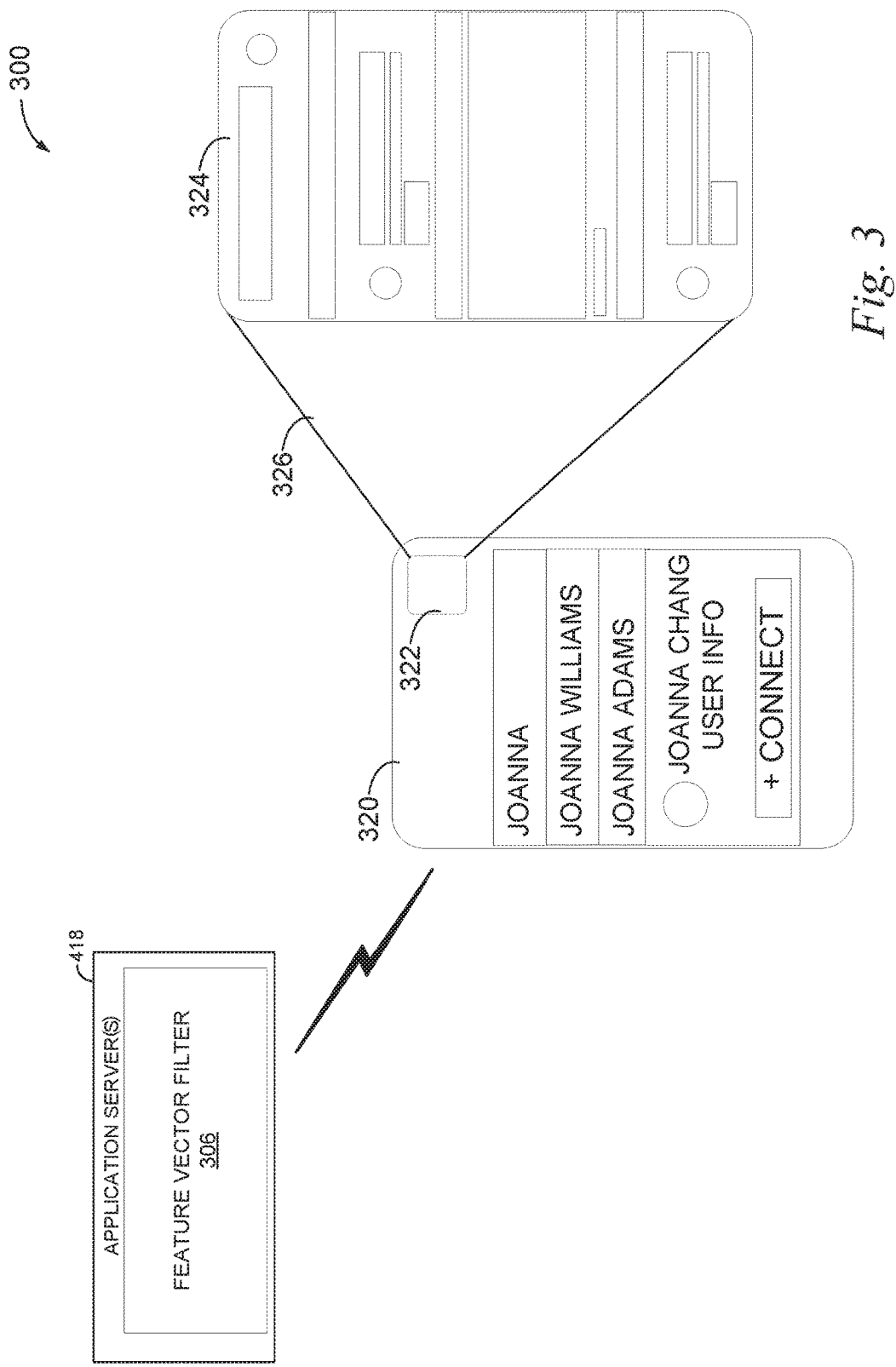
FIG. 3 illustrates, by way of example, a block diagram of an embodiment of a system for connecting with a user of a website.

FIG. 3 illustrates, by way of example, a block diagram of an embodiment of a system 300 for connecting with a user of a website. The system 300 as illustrated includes a first mobile device 320, a second mobile device 324, and application server 418. The mobile device 320 can present the user interface 200A-200C of FIG. 2 and the mobile device 324 can present the user interface 100 of FIG. 1. The mobile device 320 includes a camera 322 (in dashed lines because the camera generally faces away from the user interface of the mobile device 320 and the camera is not visible on the side of the mobile device 320 in the view of FIG. 3). The camera 322 has a field of view 326. Within the field of view 326 is a newsfeed of a user with which the user of the mobile device 320 wishes to connect. The user of the mobile device 320 can be the user associated with the information provided in the news feed.

In response to the user tapping the camera preview control 206 (see FIG. 2) or other camera control while the newsfeed is within the field of view 326, the camera 322 can produce image data representative of attributes and dominant colors of the newsfeed. In some embodiments, the mobile device 320 can provide a feature vector or the image data to the application server 418. In some other embodiments, the application server 418 can determine a feature vector of the image data provided by the mobile device 320. A feature vector filter 306 of the application server 418 can compare the feature vector to feature vectors of newsfeeds served by the website. A user associated with the feature vector that most closely matches, such as based on an L1 or L2 norm vector distance, the feature of the image data can be provided as a recommended connection, such as discussed with regard to FIG. 2. The feature vector filter 306 and the application server 418 are discussed in more detail regarding FIGS. 4 and 5. These distances can be computed by generating a Histogram of Gradients (HOG) or Scale Invariant Feature Transformation (SIFT) metadata for an image and for it's server-generated comparison set, which can be compared in a multidimensional space for image (non-text) attributes such as the dominant colors or contours in a profile picture or feed update.

Consider two members: Member 1, whose newsfeed is shown in FIG. 1 and Member 2 who desires to connect with Member 1. Member 1 can control mobile device 324 and Member 2 can control mobile device 320. Member 2 takes a photo of member 1's newsfeed with the mobile device 320. Based on one or more features of the photo, embodiments identify Member 1. Embodiments can analyze a set of attributes to reduce the search space of potential members using image recognition to map each feed update to corresponding update modules that have been served to a member. This image recognition can be applied either on the client or server.

If image recognition is applied on client devices, machine learning techniques can be user to extract one or more features of the photo. The one or more features can be provided in a feature vector to a server. The image features may include one or more image gradients, colors, corners, shapes, or orientations. A machine learning technique can be used to compare the current feature vector against a set of predetermined feature vectors associated with respective newsfeeds that have been served by the social network. For example, the SIFT algorithm can be used to extract the features and compare a feature vector to other predetermined feature vectors.

Alternatively, the application clients can send the image (e.g., in a compressed or un-compressed form) to a server. After receiving the image from the client, the server can analyze the image and apply either machine learning or deep learning methods to determine the feature vector. For example, a captured author name of a newsfeed can be translated into a string (e.g., using OCR), which can facilitate a subsequent target member to be connected. As part of the comparison with data the content database 514, a tolerance allowance is made to allow for approximate matches, such as to account for OCR inaccuracy or variation in image feature extraction.

Figure 4:
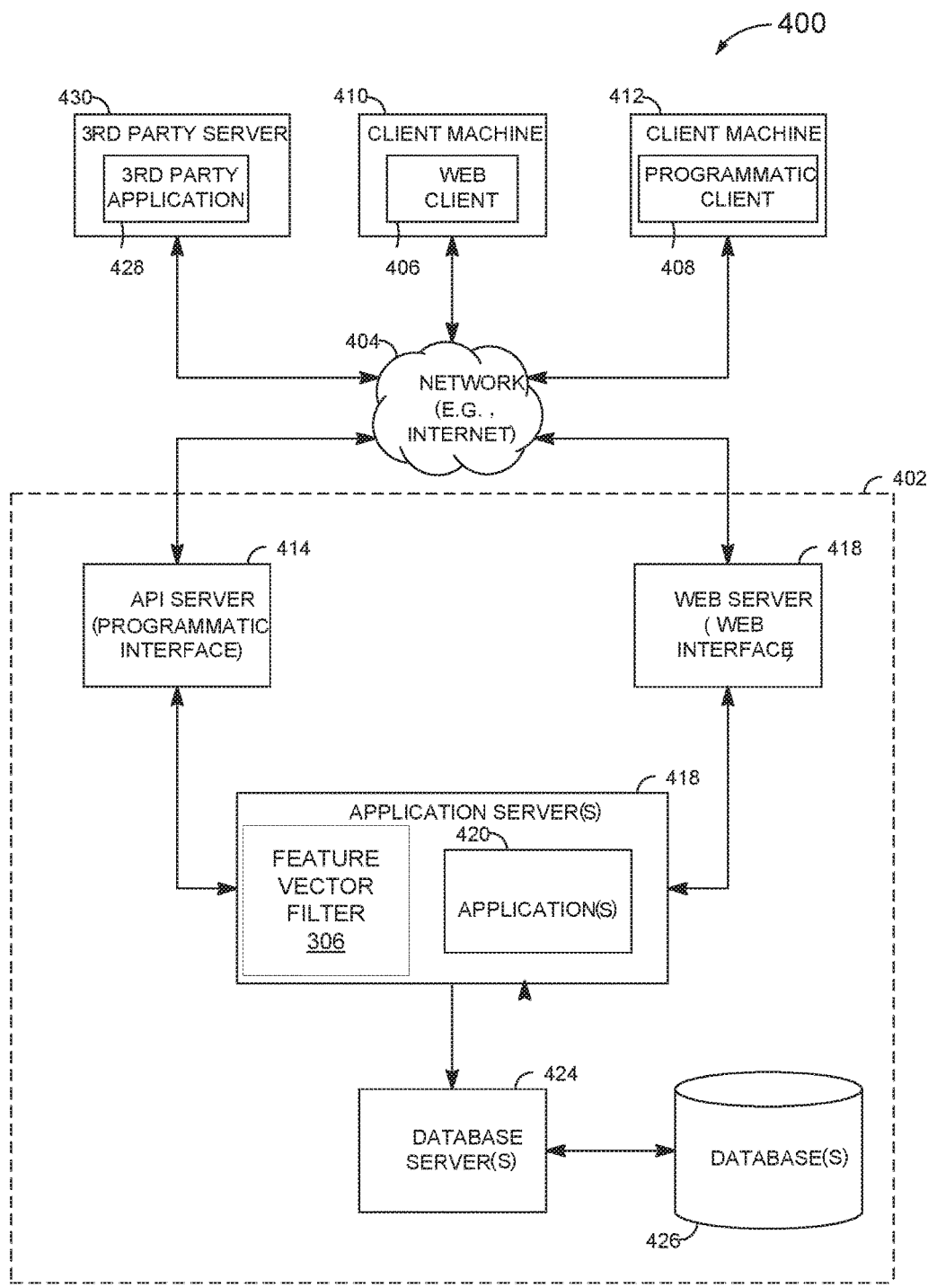
FIG. 4 is a block diagram illustrating a client-server system, in accordance with an example embodiment.

FIG. 4 is a block diagram illustrating a client-server system 400, in accordance with an example embodiment. A networked system 402 provides server-side functionality via a network 404 (e.g., the Internet or Wide Area Network (WAN)) to one or more clients. FIG. 4 illustrates, for example, a web client 406 (e.g., a browser) and a programmatic client 408 executing on respective client machines 410 and 412.

An Application Program Interface (API) server 414 and a web server 416 are coupled to, and provide programmatic and web interfaces respectively to, one or more application servers 418. The application servers 418 host one or more applications 420. The application servers 418 are, in turn, shown to be coupled to one or more database servers 424 that facilitate access to one or more databases 426. While the applications 420 are shown in FIG. 4 to form part of the networked system 402, in alternative embodiments, the applications 420 may form part of a service that is separate and distinct from the networked system 402.

Further, while the system 400 shown in FIG. 4 employs a client-server architecture, the present disclosure is not limited to such an architecture, and could be used in a distributed, or peer-to-peer, architecture system, for example. The various applications 420 could also be implemented as standalone software programs, which do not necessarily have networking capabilities.

The web client 406 accesses the various applications 420 via the web interface supported by the web server 416. Similarly, the programmatic client 408 accesses the various services and functions provided by the applications 420 via the programmatic interface provided by the API server 414.

FIG. 4 also illustrates a third-party application 428, executing on a third-party server machine 430. The third-party server machine may have programmatic access to the networked system 402 via the programmatic interface provided by the API server 414. For example, the third-party application 428 may, utilizing information retrieved from the networked system 402, support one or more features or functions on a website hosted by the third party. The third-party website may, for example, provide one or more functions that are supported by the relevant applications of the networked system 402. In some embodiments, the networked system 102 may comprise functional components of a professional social network.

The application servers 418 as illustrated host feature vector filter 306. The feature vector filter 306 compares a feature vector of a user's news feed to feature vectors of a content delivery database 514 (see FIG. 5). The feature vector filter 306 can filter users using L1 or L2 norm vector distance, one or more decision trees, Term Frequency Inverse Document Frequency (TF-IDF), or the like.

The application servers 418 or the mobile device 320 can include an application 420 that receives image data as input and produces a feature vector as output. An image recognition technique, such as scale invariant feature transform (SIFT), Histogram of Gradients (HOG), optical character recognition (OCR), or the like, can be used to extract text, image contours, dominant colors and other features of the image 104 or 108 in the field of view 326 of the camera 322.

Figure 5:
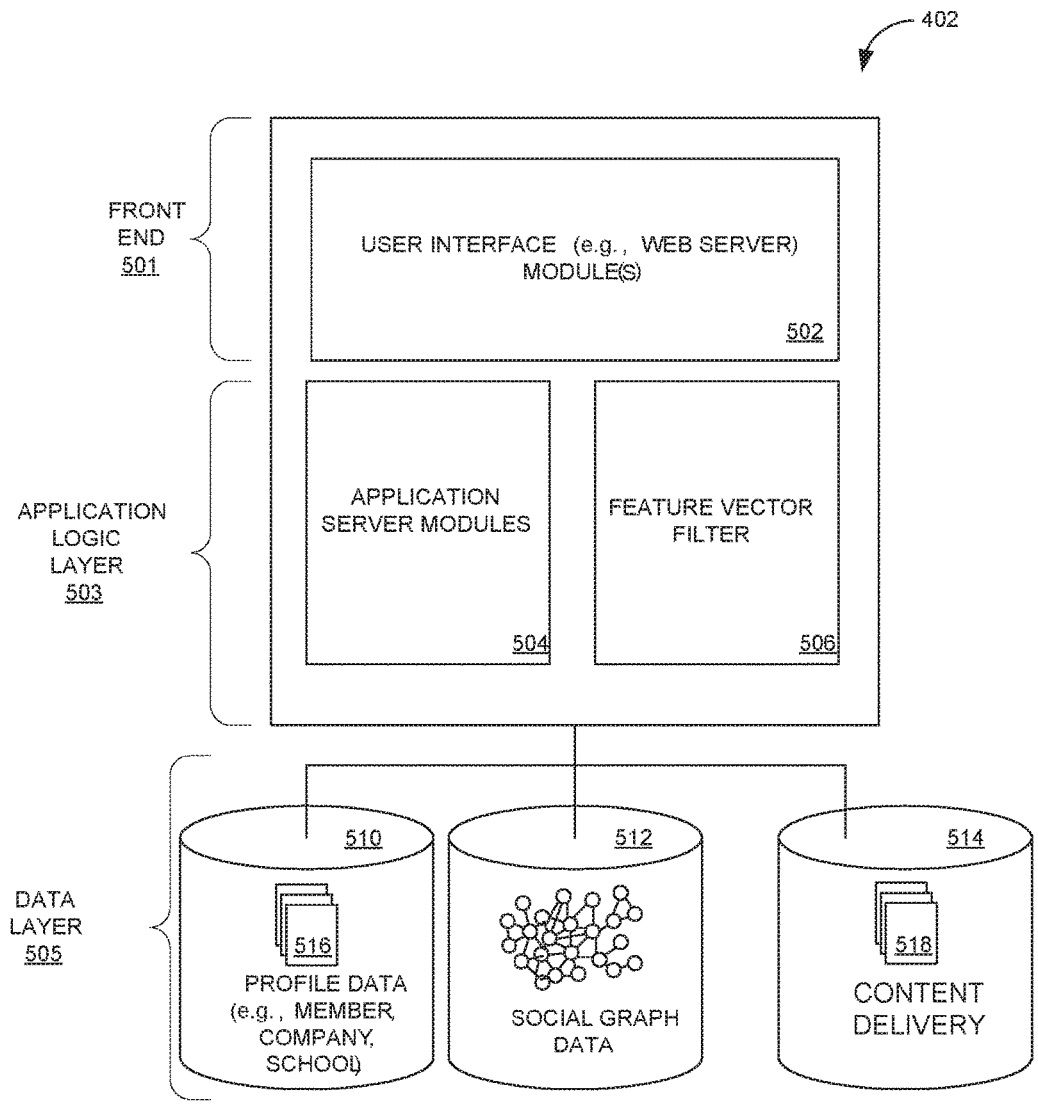
FIG. 5 is a block diagram showing functional components of a professional social network within the networked system, in accordance with an example embodiment.

FIG. 5 is a block diagram showing functional components of a professional social network within the networked system 402, in accordance with an example embodiment. As shown in FIG. 5, the professional social network may include a three-tiered architecture, consisting of a front-end layer 501, an application logic layer 503, and a data layer 505. In some embodiments, the modules, systems, and/or engines shown in FIG. 5 represent a set of executable software instructions and the corresponding hardware (e.g., memory and processing circuitry (e.g., a processor, field programmable gate array (FPGA), and/or components configured to execute instructions and perform operations dictated by the instructions, such as can include a transistor, resistor, inductor, capacitor, regulator, power source, multiplexer, amplifier, switch, buffer, diode, or the like) for executing the instructions. One skilled in the art recognizes that various additional functional modules or engines may be used with a professional social network, such as that illustrated in FIG. 5, to facilitate additional functionality that is not specifically described herein. The various functional modules and engines depicted in FIG. 5 may reside on a single server computer, or may be distributed across several server computers in various arrangements. Moreover, although a professional social network is depicted in FIG. 5 as a three-tiered architecture, embodiments are not limited to such architecture. Other architectures are within the scope of the present disclosure.

As shown in FIG. 5, in some embodiments, the front-end layer 501 comprises a user interface module (e.g., a web server) 502, which receives requests and inputs from various client-computing devices (e.g., client machine 410 or 412, or $3^{rd}$ party server 430), and communicates appropriate responses to the requesting client devices. For example, the user interface module(s) 502 may receive requests in the form of Hypertext Transport Protocol (HTTP) requests, or other web-based, application programming interface (API) requests.

In some embodiments, the application logic layer 503 includes various application server modules 504, which, in conjunction with the user interface module(s) 502, generates various user interfaces (e.g., web pages, such as newsfeeds) with data retrieved from various data sources in the data layer 505. In some embodiments, individual application server modules 504 are used to implement the functionality associated with various services and features of the professional social network. For instance, the ability of an organization to establish a presence in a social graph of the social network service, including the ability to establish a customized web page on behalf of an organization, or to publish messages or status updates on behalf of an organization, may be services implemented in independent application server modules 504. Similarly, a variety of other applications or services that are made available to members of the social network service may be embodied in their own application server modules 504.

As shown in FIG. 5, the data layer 505 may include several databases, such as a database 510 for storing profile data 516, including both member profile attribute data as well as profile attribute data for various organizations. In some embodiments, when a person initially registers to become a member of the professional social network, the person is prompted to provide some profile attribute data, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 510. Similarly, when a representative of an organization initially registers the organization with the professional social network, the representative may be prompted to provide certain information about the organization. This information may be stored, for example, in the database 510, or another database (not shown). In some embodiments, the profile data 516 may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or a seniority level within a company. In some embodiments, importing or otherwise accessing data from one or more externally hosted data sources may enhance profile data 516 for both members and organizations. For instance, with companies, financial data may be imported from one or more external data sources, and made part of a company's profile.

The profile data 516 may also include information regarding settings for members of the professional social network. These settings may comprise various categories, including, but not limited to, privacy and communications. Each category may have its own set of settings that a member may control.

After a user is registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. The various associations and relationships that the members establish with other members, or with other entities and objects, may be stored and maintained as social graph data within a social graph database 512.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

In some embodiments, the professional social network provides an application programming interface (API) module through which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. Some third-party applications may reside and execute on one or more mobile devices (e.g., a smartphone, or tablet computing devices) having a mobile operating system, such as the client machine 410 or 412.

The data in the data layer 505 may be accessed, used, and adjusted by the application 420. Although the feature vector filter 306 and the application 420 are referred to herein as being used in the context of a professional social network, it is contemplated that it may also be employed in the context of any website or online services, including, but not limited to, content sharing sites (e.g., photo- or video-sharing sites, text-sharing sites, financial management sites, retail sites, or the like) and any other apps that try to gain and retain a user's attention. Although features of the present disclosure are referred to herein as being used or presented in the context of an app, it is contemplated that any user interface view (e.g., a user interface on a mobile device or on desktop software) is within the scope of the present disclosure.

In one or more embodiments, the data layer 505 further includes a database 514 that includes content delivery data 518 based on newsfeeds provided to users of the social network. The content delivery data 518 includes data regarding the updates provided to users through their newsfeeds, such as can include a time the newsfeed was presented, updates included in the newsfeed, the order of the updates included in the newsfeeds, social counts of the updates in the newsfeed (e.g., number of likes, shares, comments, or the like), status headers of the respective updates, or the like. A feature vector can be determined for the newsfeed presented, stored in the content delivery database 514, and associated with the newsfeed in the content delivery data 518. The feature vector can be determined using a same technique that is used to determine the feature vector of the newsfeed captured using the mobile device 320.

Figure 6:
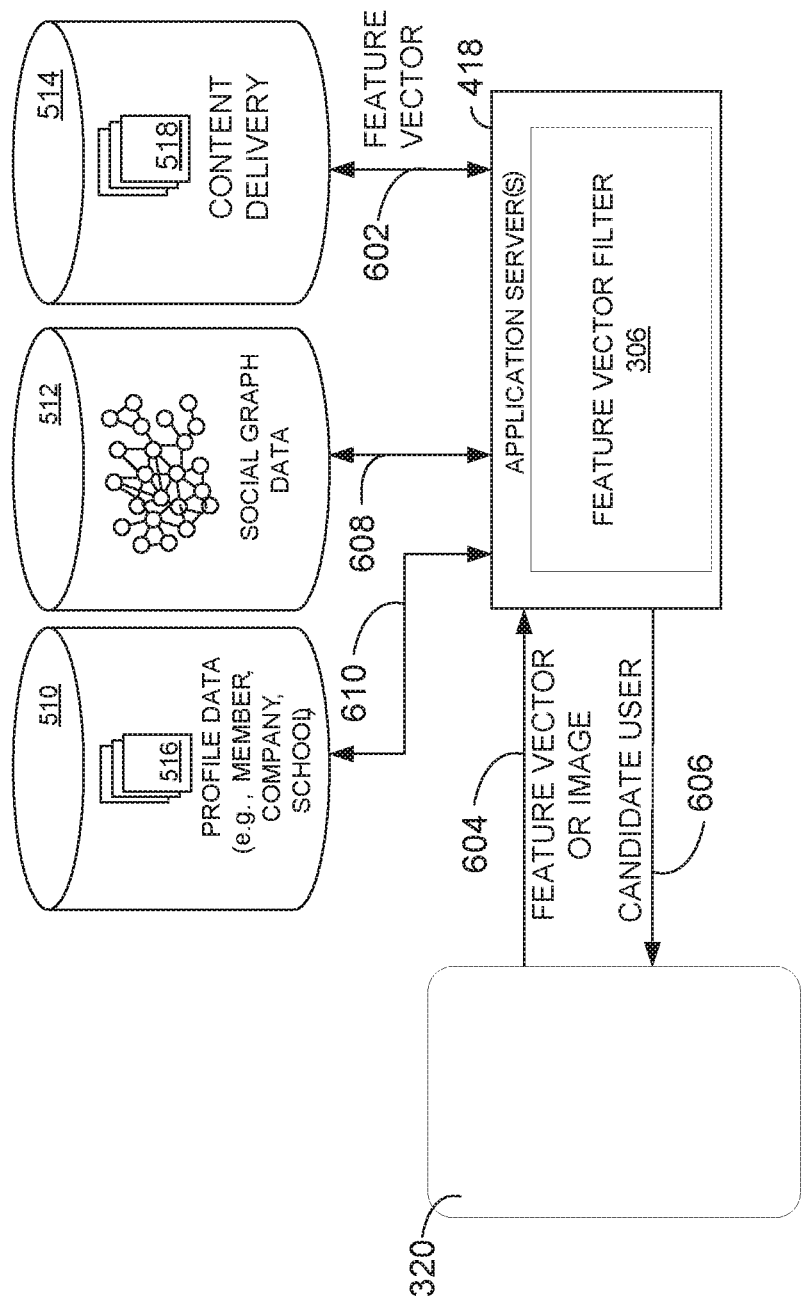
FIG. 6 illustrates, by way of example, a diagram of an embodiment of a system for connecting users of a social network.

FIG. 6 illustrates, by way of example, a diagram of an embodiment of a system 600 for helping a user connect with another user of a website. The system 600 as illustrated includes the mobile device 320, the application server 418, and databases 510, 512, and 514. The application server 418 as illustrated includes the feature vector filter 306. The feature vector filter 306 can receive an image or feature vector from the mobile device 320. The feature vector filter 306 can issue a query to the content delivery database 514 for one or more feature vectors 602 of newsfeeds of users that have been presented, such as within a certain time window specified by the query. The feature vector filter 306 can determine a subset of users associated with the feature vector or image 604 through a response to one or more queries to the profile data database 510, the social graph data database 512, or the content delivery database 514.

For example, the feature vector filter 306 can (a) issue a query to the social graph data database 512 to determine users connected to one or more users mentioned in the newsfeed of the image, (b) issue a query to the content delivery database 514 to determine users that were presented newsfeeds with a specific social counts on an update of their newsfeed, (c) issue a query to the content delivery database 514 to determine users that were presented newsfeeds with updates in a specific order, (d) issue a query to the content delivery database 514 to determine one or more feature vectors of users that match one, all, or some number in between of the response(s) from the query issued in (a)-(c), or (e) issue a query to the profile data database 610 for profile data, such as a profile picture, job data, or the like, of a user determined to match the feature vector or image 604 based on reduction of possible users or comparison of feature vectors 604 and 602.

Using responses to one or more queries, the feature vector filter 306 can reduce a set of possible users that are associated with the photographed newsfeed. The feature vector filter 306 can perform queries in a specified order, such as can be programmed into the feature vector filter 306 or determined by the feature vector filter 306 in accessing a policy that defines the order.

Consider an example in which the social graph data database 512 indicates one hundred users are connected to two users mentioned on the newsfeed, and of those one hundred users, the content delivery database 514 indicates that two were presented updates in a specified order. The feature vectors 602 can be retrieved for those two users and one or more colors indicated in those feature vectors 602 can be compared to one or more colors in the feature vector or image to uniquely determine the one user of the two users that are associated with the newsfeed further based on profile picture colors.

Figure 7:
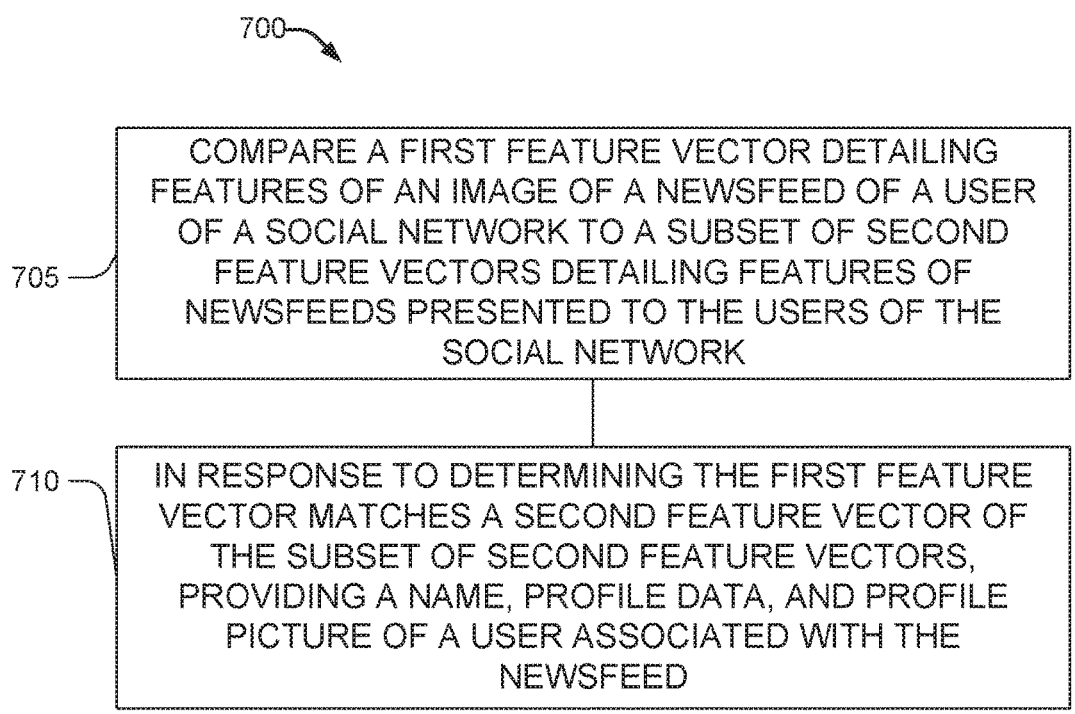
FIG. 7 is a flowchart illustrating an example method, according to various embodiments.

FIG. 7 is a flowchart illustrating an example method 700, according to various embodiments. The method 700 as illustrated includes, comparing a first feature vector detailing features of an image of a newsfeed of a user of users of a social network to a subset of second feature vectors detailing features of newsfeeds presented to the users of the social network, at operation 705; and in response to determining the first feature vector matches a second feature vector of the subset of second feature vectors, providing a name, profile data, and profile picture of a user associated with the newsfeed, at operation 710.

The method 700 can further include determining the subset of second feature vectors by filtering the second feature vectors to include feature vectors of users currently logged on to the social network. The method 700 can further include determining the subset of second feature vectors by filtering the second feature vectors based on a degree of connection between a first user associated with the first feature vector and respective second users associated with respective second feature vectors of the second feature vectors.

The method 700 can further include determining the second feature vectors before presenting associated respective newsfeeds to the users of the social network site. The method 700 can further include determining the subset of second feature vectors by filtering the second feature vectors based on a color in a profile picture in the image of the newsfeed. The method 700 can further include before comparing the first feature vector to the subset of second feature vectors, determining, based on image data provided by a mobile device, the first feature vector. The method 700 can further include, before comparing the first feature vector to the subset of second feature vectors, receiving, from a mobile device, the first feature vector.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module mechanically, in dedicated and permanently configured circuitry, or in temporarily configured circuitry (e.g., configured by software) may be driven by cost and time considerations.

The term "hardware module" is a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. Another hardware module may, at a later time, access the memory device to retrieve and process the stored output. Hardware modules may initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product (e.g., a computer program tangibly embodied in an information carrier, such as in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server is generally remote from each other and typically interact through a communication network. The relationship of client and server arises through computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
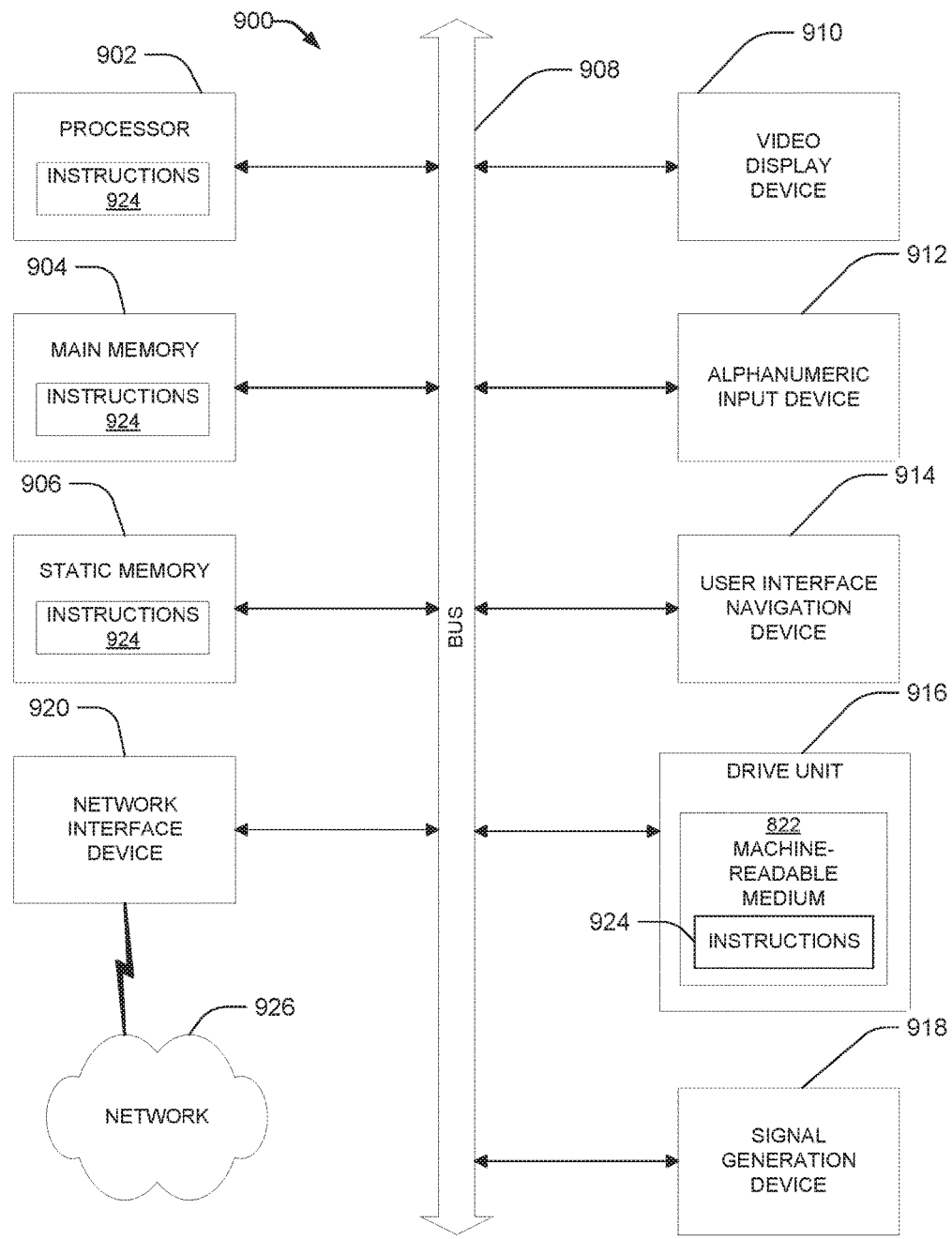
FIG. 8 is a block diagram of an example computer system on which operations, actions and methodologies described herein may be executed, in accordance with an example embodiment.

FIG. 8 is a block diagram of an example computer system 800 on which operations, actions and methodologies described herein may be executed, in accordance with an example embodiment. One or more components of the feature vector filter 306, front end 201, mobile device 320 or 324, application logic layer 203, data layer 205, the system 200, or the like, may include one or more components of the computer system 900. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 900 includes a processor 902 (e.g., a central processing unit (CPU), a graphics processing unit (GPU) or both), a main memory 904, and a static memory 906, which communicate with each other via a bus 908. Computer system 700 may further include a video display device 910 (e.g., a liquid crystal display (LCD) or a cathode ray tube (CRT)). Computer system 900 also includes an alphanumeric input device 912 (e.g., a keyboard), a user interface (UI) navigation device 914 (e.g., a mouse or touch sensitive display), a disk drive unit 916, a signal generation device 918 (e.g., a speaker) and a network interface device 920.

Disk drive unit 916 includes a machine-readable medium 922 on which is stored one or more sets of instructions and data structures (e.g., software) 924 embodying or utilized by any one or more of the methodologies or functions described herein. Instructions 924 may also reside, completely or at least partially, within main memory 904, within static memory 906, and/or within processor 902 during execution thereof by computer system 900, main memory 904 and processor 902 also constituting machine-readable media.

While machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" includes any tangible medium that may store, encode, or carry instructions for execution by the machine and that cause the machine to perform any one or more of the methodologies of the present technology, or that may store, encode, or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 924 may further be transmitted or received over a communications network 926 using a transmission medium. Instructions 924 may be transmitted using network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that may store, encode, or carry instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A device comprising:
   a processor;
   a camera;
   a display to provide a view of a social network app executable on the device;
   a memory device holding an instruction set executable on the processor to cause the device to perform operations comprising:
   providing, by the display, a camera preview control that includes a view of a newsfeed of a first user in a field of view of the camera;
   recording image data from the field of view of the camera;
   (a) determining a first feature vector of the image data and providing the first feature vector to an application server or (b) providing the image data to the application server;
   receiving data indicating a name, profile picture, and profile data of the first user based on a comparison of the first feature vector with second feature vectors stored in a database; and
   providing, on the user interface, the name, the profile picture, the profile data, and a connect control, the connect control, when selected, causes a connection request message to be provided to the first user.

2. The device of claim 1, wherein the camera preview control is provided in response to a determination that a character has been input into a search control provided on the display.

3. The device of claim 2, wherein the operations further comprise, providing, by the display, a list of one or more other users of the social network that include a portion of their name that matches the name being input into the search control.

4. The device of claim 1, wherein (a) determining a first feature vector of the image data and providing the first feature vector to an application server or (b) providing the image data to the application server includes (a) determining a first feature vector of the image data and providing the first feature vector to an application server.

5. The device of claim 4, wherein the first feature vector of the image data includes one or more of content of a social header of the newsfeed, a degree of the connection between the first user and a second user, social counts in the newsfeed, an order of the updates in the newsfeed, badge counts in the newsfeed, or colors of the profile picture in the newsfeed.

6. The device of claim 5, wherein the first feature vector of the image data includes social counts in the newsfeed, an order of the updates in the newsfeed, and badge counts in the newsfeed.

7. The device of claim 1, wherein the data indicating the name, the profile picture, and the profile data of the first user is filtered to include only users currently logged into the social network associated with the social network app.

8. A method of connecting users of a social network, the method comprising:
   comparing a first feature vector detailing features of an image of a newsfeed of a user of users of a social network to a subset of second feature vectors detailing features of newsfeeds presented to the users of the social network; and
   in response to determining the first feature vector matches a second feature vector of the subset of second feature vectors, providing a name, profile data, and profile picture of a user associated with the newsfeed.

9. The method of claim 8, further comprising determining the subset of second feature vectors by filtering the second feature vectors to include feature vectors of users currently logged on to the social network.

10. The method of claim 8, further comprising determining the subset of second feature vectors by filtering the second feature vectors based on a degree of connection between a first user associated with the first feature vector and respective second users associated with respective second feature vectors of the second feature vectors.

11. The method of claim 8, further comprising determining the second feature vectors before presenting associated respective newsfeeds to the users of the social network site.

12. The method of claim 8, further comprising determining the subset of second feature vectors by filtering the second feature vectors based on a color in a profile picture in the image of the newsfeed.

13. The method of claim 8, further comprising, before comparing the first feature vector to the subset of second feature vectors, determining, based on image data provided by a mobile device, the first feature vector.

14. The method of claim 8, before comparing the first feature vector to the subset of second feature vectors, receiving, from a mobile device, the first feature vector.

15. A non-transitory machine-readable storage medium embodying instructions that, when executed by one or more processors, cause the one or more processors to perform operations comprising:
   comparing a first feature vector detailing features of an image of a newsfeed of a user of users of a social network to a subset of second feature vectors detailing features of newsfeeds presented to the users of the social network; and
   in response to determining the first feature vector matches a second feature vector of the subset of second feature vectors, providing a name, profile data, and profile picture of a user associated with the newsfeed.

16. The non-transitory machine-readable storage medium of claim 15, further comprising determining the subset of second feature vectors by filtering the second feature vectors to include feature vectors of users currently logged on to the social network.

17. The non-transitory machine-readable storage medium of claim 15, further comprising determining the subset of second feature vectors by filtering the second feature vectors based on a degree of connection between a first user associated with the first feature vector and respective second users associated with respective second feature vectors of the second feature vectors.

18. The non-transitory machine-readable storage medium of claim 15, further comprising determining the second feature vectors before presenting associated respective newsfeeds to the users of the social network site.

19. The non-transitory machine-readable storage medium of claim 15, further comprising determining the subset of second feature vectors by filtering the second feature vectors based on a color in a profile picture in the image of the newsfeed.

20. The non-transitory machine-readable storage medium of claim 15, further comprising, before comparing the first feature vector to the subset of second feature vectors, determining, based on image data provided by a mobile device, the first feature vector.

* * * * *